June 17, 1924.
L. T. EANES
AUTOMOBILE SIGNAL
Filed Aug. 4, 1923
1,498,363
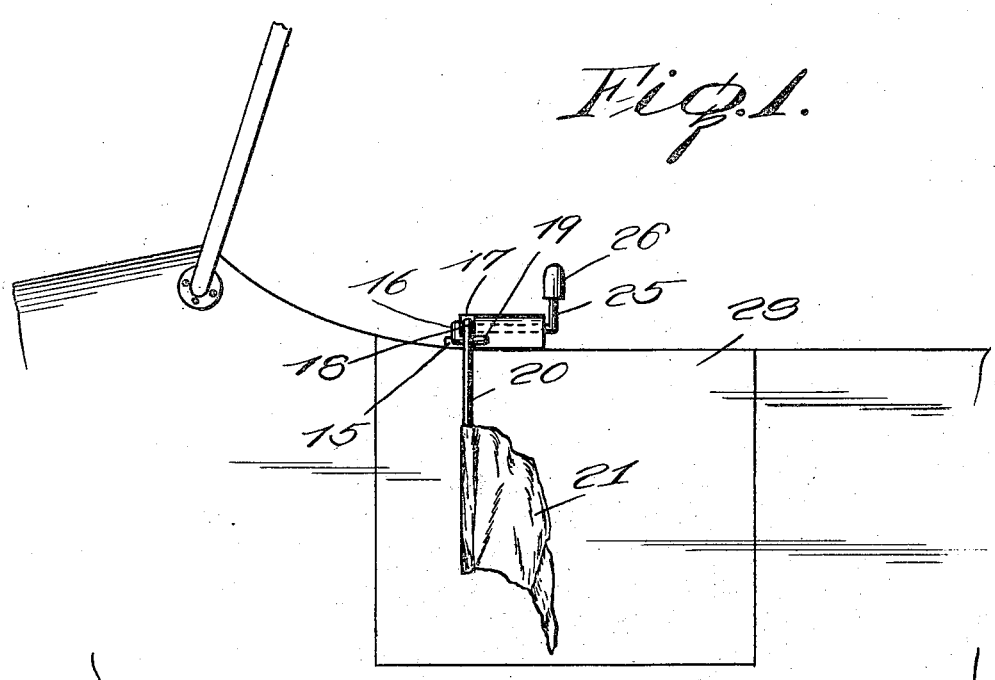
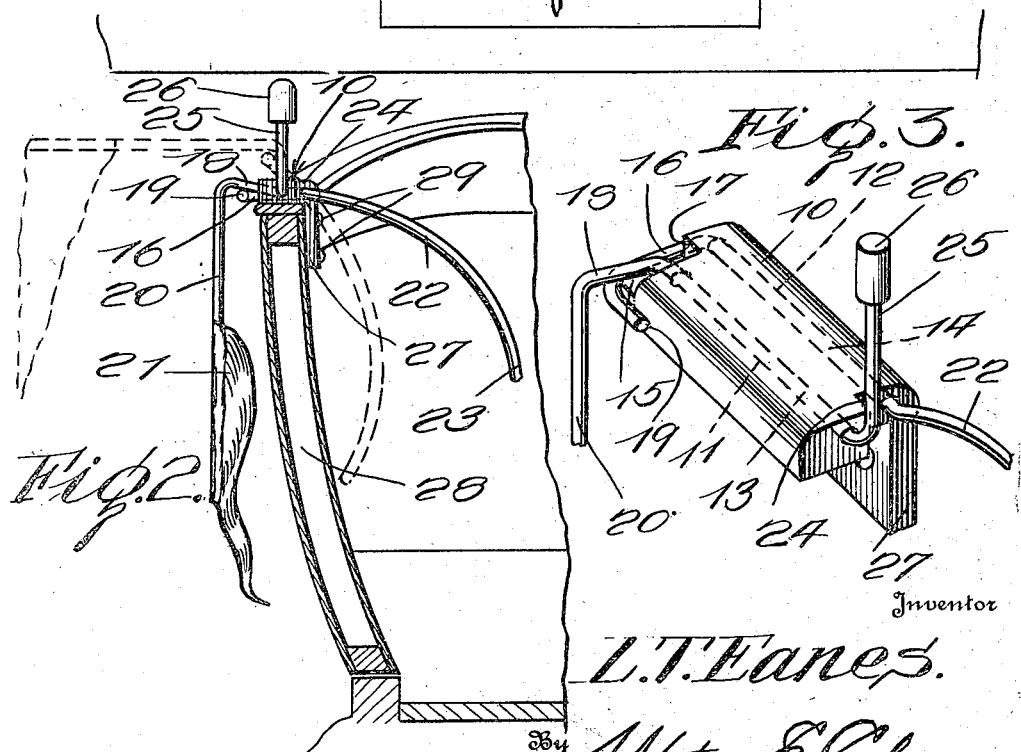
Inventor
L. T. Eanes.
By Watson E. Coleman
Attorney Patented June 17, 1924.

1,498,363

UNITED STATES PATENT OFFICE.

LOUIS T. EANES, OF SELMA, ALABAMA.

AUTOMOBILE SIGNAL.

Application filed August 4, 1923. Serial No. 655,632.

*To all whom it may concern:*

Be it known that I, LOUIS T. EANES, a citizen of the United States, residing at Selma, in the county of Dallas and State of Alabama, have invented certain new and useful Improvements in Automobile Signals, of which the following is a specification, reference being had to the accompanying drawings.
This invention relates to improvements in automobile signals and more particularly to an automobile signal of the semaphore type.

An important object of the invention is to provide a device of this character which may be operated either by the hand or knee of the operator to extend a signal arm bearing a signal element.

A further object of the invention is to provide a device of this character applied to the door of an automobile of the touring or roadster type without in any manner altering the construction thereof.

A further object of the invention is to provide a device of this character which may be very cheaply and readily produced, which will be simple in its construction and operation, which will be durable and efficient in service and a general improvement in the art.
These and other objects I attain by the construction shown in the accompanying drawings wherein for the purpose of illustration is shown a preferred embodiment of my invention and wherein:—
Figure 1 is a side elevation showing a signal constructed in accordance with my invention applied to a vehicle;

Figure 2 is an end elevation thereof, the vehicle being shown in section;
Figure 3 is a fragmentary perspective view of the signal detached.

Referring now more particularly to the drawings, the numeral 10 indicates a bearing member substantially rectangular in form and having formed therein a pair of parallel bearing bores 11 and 12 in which are mounted shafts 13 and 14. The bearing member is provided at one end thereof with an outstanding ledge 15 having its upper surface immediately below the bores 11 and 12 to form a rest and limit for an angular arm 16 formed on the shaft 14. At the same end of the bearing a notch 17 is formed in the bearing at that portion thereof including and lying outwardly of the bearing with respect to the bore 11, this notch receiving an angular arm 18 formed on the shaft 13 and housing this angular arm to prevent its engagement by the angular arm 16 of the shaft
14. The angular arm 16 of the shaft 14 is provided with an end portion 19 paralleling the shaft 14 and extending under the angular arm 18 of the shaft 13. The extremity of the angular arm 18 of the shaft 13 is provided with a down bent portion 20 having at its free end a signal element 21.

At the opposite end thereof from the angular arm 16 the shaft 14 has a second arm 22 which normally inclines downwardly and outwardly from the bearing and is provided at its lower end with an engaging portion 23. The upper end portion of this arm is received within a notch 24 formed in the adjacent end of the bearing which houses this upper end portion and prevents its engagement by an angular arm 25 formed on the corresponding end of the shaft 13. The arm 25 is provided at its free end with a handle 26 and this arm normally extends vertically. The bearing 10 is provided with a right-angular extension 27 adapted to abut the inner face of a vehicle door or body 28 when the bearing 10 is engaged with the upper surface thereof, the angular extension of the bearing having means whereby it may be secured to the door or body, as indicated at 29. When the bearing is in secured position upon the door the extension 20 of the arm 18 of the shaft 13 parallels the outer face of the door and is substantially vertically disposed. The arm 22 of the shaft 14 extends downwardly and inwardly of the door and has its lower end in spaced relation thereto. This lower end is preferably arranged at such height that it may be conveniently engaged by the knee of the operator of the vehicle to move the same toward the door. If this lower end is moved toward the door the shaft 14 is, of course, rocked and the angular arm 16 of the shaft will have its end bearing the extension 19 elevated. During its elevation the extension 19 engages the angular arm 18 of the shaft 13 causing this angular arm to be elevated and accordingly the extension 20 thereof to be oscillated to place the same in a substantially horizontal signaling position. The same effect may be produced by oscillating the shaft 11 through medium of the angular arm 25 and handle 26 thereof.

It will thus be seen that the device produced may be attached to the door or body of a vehicle simply by inserting a pair of securing elements, which may consist of wood screws or the like, and which by its application provides a signal operable either by the knee or hand of the operator as is most convenient. It will furthermore be obvious that the construction hereinbefore set forth is capable of a certain range of change and modification without in any way departing from the spirit of my invention and I accordingly do not limit myself to such specific structure except as hereinafter claimed.

I claim:—

1. A signalling attachment for automobiles comprising a bearing member adapted to be mounted upon the side wall of the automobile, a shaft extending longitudinally through the bearing member and having a handle at one end, the shaft being outwardly extended at the opposite end and then downwardly extended and carrying a signal, and a second shaft passing through the bearing member and formed to provide an outwardly extended actuating terminal at one end and at its other end angularly bent and extended beneath the angular end of the first named shaft whereby the second named shaft may be operated to oscillate the first named shaft or the first named shaft may be operated by itself.

2. A signal for automobiles including two shafts, one of which operatively engages with a signal to actuate it and is provided with a handle, the other shaft having means whereby it may be operated by the knee of the operator and when so operated actuating the first named shaft, the first named shaft being operable independent of the second named shaft.

3. A signalling attachment for automobiles comprising a member adapted to be mounted upon the door of an automobile and having two longitudinally extending bearings, a shaft extending through one of said bearings and at one end being outwardly and downwardly bowed to form a knee operated terminal, the opposite end of the shaft being extended laterally outward and then rearward, a second shaft passing through the bearing member and having an angular end resting upon the last named angular end of the first named shaft and then extended downward and provided with a signal, the opposite end of the second named shaft having a normally upstanding handle, and means on the bearing member for supporting said shafts in the position named but permitting either of the said shafts to be oscillated to carry the signalling member upward.

4. A signalling device of the character described comprising a bearing member angular in cross section and adapted to be fitted against the door of an automobile and formed at one end with a recess having a lower wall, a shaft extending longitudinally through the bearing member and at its rear end being upwardly bent to form a handle and at its opposite end being angularly bent laterally, this angular end normally resting upon the bottom wall of said recess, the outer end of the angular portion then being extended downward and carrying a signalling member, a second shaft extending longitudinally through the bearing member and at its rear end being formed with an outwardly and downwardly curved operating terminal adapted to be operated by the knee of the driver of the car, the opposite end of the shaft being angularly bent laterally and then angularly bent beneath the angular bend of the first named shaft, the bearing member being recessed to receive the angular end of the second named shaft and prevent depression thereof.

5. An automobile signal comprising a supporting member, a shaft carrying a signal and adapted to be oscillated by hand, a second shaft having a terminal end adapted to be actuated by the knee of the operator, and means whereby the second named shaft when its terminal end is forced inward will oscillate the first named shaft to raise the signal or whereby the first named shaft may be operated independently of the second named shaft.

In testimony whereof I hereunto affix my signature.

LOUIS T. EANES.